Aug. 9, 1949.  P. C. STARK  2,478,335
TIRE CHAIN SECURING MEANS
Filed March 22, 1946

*INVENTOR.*
PEARL C. STARK
BY
*John W. Hoof*
ATTORNEY

Patented Aug. 9, 1949

2,478,335

UNITED STATES PATENT OFFICE 2,478,335

TIRE CHAIN SECURING MEANS

Pearl C. Stark, Bartonsville, Vt.

Application March 22, 1946, Serial No. 656,374

2 Claims. (Cl. 152—242)

This invention relates to means for facilitating the mounting of a tire chain on a vehicle wheel.

As used herein the term "tire chain" relates to an anti-skid or traction device adapted to be fastened around the periphery of a vehicle wheel while it is attached to the vehicle and having at least a pair of longitudinally extending members, and interconnecting cross members, having means by which the opposite ends of said longitudinally extending members may be secured together, on the inside and the outside of a tire, with the cross members extending over the tread of the tire.

Many attempts have been made to provide means for lessening the effort, the time, and the annoyance involved in mounting tire chains on vehicle wheels, especially while they are mounted on an automobile or other vehicle. Means have heretofore been suggested for positioning on the tire one end of the tire chain, while the other end is brought around the tire and is attached to the first mentioned end. These devices, however, have never been generally accepted or gone into general use because they do not sufficiently simplify the operation but have left it necessary for the person applying the tire chain to employ both of his hands, and to either get under the vehicle, or to reach around behind the vehicle wheel thus getting his hands and the cuffs of his shirt sleeves and the like, as well as other clothing, soiled from contact with the wheel, and the tire, and the inside of the mud-guard in the case of an automobile.

The invention disclosed herein successfully simplifies the job of applying the tire chain to a vehicle wheel in a practical way, making it possible for an operator to apply a tire chain to a wheel, employing, if desired, only one hand and a minimum of time. I have found that with the combination of link and clamp disclosed herein I am able to put tire chains on the wheels of an automobile in an overall time which is on the order of only a minute per tire chain applied.

An object of the invention is thus to provide a simple, practical apparatus for facilitating the application of a tire chain to a tire on a vehicle wheel.

Another object of the invention is to provide means of the above mentioned kind which will be easy to employ and whereby the tire chain may be applied by the use of only one hand.

Another object of the invention is to provide the combination of tire chain link and positioning clamp by which the link may be supported in position to be incorporated in the inside longitudinally extending member of the tire chain, thereby closing said member into an endless member, after which the positioning means may be readily disengaged from the link and removed from the tire, leaving the chain on the tire in readiness for use.

Another object of the invention is to provide a simple, practical and efficient link for attachment at one end of the inside longitudinally extending member of a tire chain to serve as a permanent part of the tire chain to facilitate applying and removing of a tire chain to the tire of a vehicle wheel.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a perspective view of a clamp and link combination embodying my invention;

Figure 2 is a view of one step in the use of the apparatus embodying the invention; and Figure 3 is another view of the use of the apparatus in applying the tire chain to a tire mounted on a vehicle wheel.

As illustrated herein, I provide a link 10 which is essentially a rectangular, more or less oblong member which may be stamped from metal or otherwise formed of metal, plastic, or other hard, durable material. At one end it has means for attachment at one end of one of the longitudinally extending members of a tire chain. Connecting together the ends of the longitudinal chain member which extends around the wheel on the inside is the most difficult step in putting on a tire chain. Tire chains as supplied by the manufacturer ordinarily have an ordinary link at one end of each of the longitudinally extending members 14 and 17, and a clasp at the other end of each of said longitudinally extending members. Link 10 is intended to be substituted for the clasp at one end of one of said longitudinally extending members, as it comes from the manufacturer, which is applied around the inside surface of a wheel and made a permanent part of the tire chain. Accordingly it is provided at one end with an aperture 11, interconnected with an outer edge of link 10 by the slot 12 so that the portion of the link below slot 12 may be bent out of the plane of link member 10 sufficiently to permit the end of a link 13 (the link from which the clasp has been detached) of the side or longitudinally extending member 14 of a tire chain to be inserted through slot 12, after which the portion below slot 12 may be bent back into the plane of link 10 thereby causing link 13 to be securely attached to the end of said side chain or longitudinally extending member 14. In other words the portion of link 10 below slot 12 is flexed out of the plane of link 10 only while inserting link 13 into the said slot. This operation need be performed only once, when the link 10 is first made a permanent part of the inside longitudinal chain member comprising a part of the tire chain, or the link 10 may be provided by the chain manufacturer and assembled as the end link of chain member 14 at the factory.

At its outer end link 10 is tapered into a narrow finger-like portion which is bent back on itself through 180° forming the hook 15. Hook 15 is adapted to engage the end link 14a carried at the opposite end of the side chain or longitudinally extending member 14.

Intermediate its ends the links 10 has another hook 16, which may be stamped out of the body of link 10, and which extends outwardly and rearwardly, longitudinally, of member 10, and with its open end in the direction of aperture 11. Hook 16 serves to make a sliding, readily disengageable connection with a tire clamp 20 as will be described.

For interconnection with link 10 and for holding it initially in a position in which the link 14a, at the other end of inside tire chain 14, may be easily and readily attached to it, with the use of only one hand by the operator applying the tire chain to the vehicle wheel, a clamp 20 is provided which is adapted to be readily slipped over or removed from a vehicle wheel tire. It is more or less horse-shoe shaped having a semi-circular intermediate portion adapted to extend over the tread of the tire on which the chain is to be applied, and having ends which are bent somewhat outwardly to facilitate placing the clamp on the vehicle wheel tire, the clamp being resilient and adapted to frictionally engage the sides of the tire to which it is applied sufficiently to retain it in position while entraining with it one end of a tire chain, during the operation of wrapping the tire chain around the vehicle wheel and securing together the ends of tire chain member 14 on the inside of the vehicle wheel, as will be explained.

The tire clamp 20 is provided with side hooks 21 and 22, on opposite sides, positioned so that they extend radially inward of the tire to which the clamp is applied, over opposite faces of the tire. The hooks 21 and 22 may desirably be struck out from the metal or other material of which tire clamp 20 is made, and each hook extends outwardly and forwardly of the clamp, with its free end extending in the general direction of the proximate free end of the clamp. Thus the body portion of each hook member 21 and 22 is spaced outwardly from the clamp, and extends substantially parallel to the portion of the clamp which it covers. Link 10 is inserted between the body of the clamp and hook 21, under the free end of hook 21, into position for hook 16 of link 10 to be hooked over hook 21 of the clamp, as illustrated in Figure 1. In this position link 10 will extend substantially at right angles to clamp 20, and it will be noted the engagement between hooks 16 and 21 is such that hook 21 may be disengaged from hook 16 by merely pulling clamp 20 in a direction to cause hook 21 to slide out from under hook 16 of the link.

Extending circumferentially around each clamp 20, from hook 21 to hook 22 a bead $b$ is formed thereby strengthening the clamp and adding to its resiliency.

Adjacent the ends of clamp 20 respectively cutouts 23 and 24 are formed, one from the lower edge and one from the top edge, and the cutout portions of the ends may be interengaged when the clamp is not in use to keep the clamp in unextended position and thus preserve its resiliency.

In the application of the combination of my novel link 10, and coacting chain and link positioning clamp 20, the link 10 is first attached at one end of chain member 14, being substituted for the conventional clasp provided on the end of member 14 by the tire chain manufacturer as has been explained. Link 10 is thus made a permanent part of the tire chain, as the link at one end of member 14, and clasp $c$ remains on the corresponding end of member 17. The end of the tire chain thus equipped with link 10 is then attached, by the links 10 and 18 of its inside and outside longitudinal members 14 and 17 respectively, to the hooks 21 and 22 respectively, on the inside and the outside of a clamp 20 which is placed over a readily accessible portion of the tread of the tire to which the chain is to be applied. Link 18 is the ordinary link next to the clasp $c$ on chain member 17. It slips readily over the hook 22 and the clasp $c$ is thus positioned in advance or above clamp 20, ready for attachment to the link 17a at the other end of member 17. The automobile or other vehicle is then driven forward a sufficient distance to cause the chain to be wrapped around the tire, after which the respective end links 10 and 14a of member 14 are secured together. The ends of member 17, which extend around the outer or exposed face of the vehicle wheel and tire, are attached together by engaging end link 17a in clasp $c$, thus completing the mounting of the tire chain on the vehicle wheel. Preferably clasp $c$ and link 17a are secured together before removing clamp 20. Clamp 20 is removed from the tire detaching itself from link 10 which is now a part of chain member 14, and from link 18 if link 18 has not already been detached. The clamp 20 is applied to the tire wheel by simply pushing it over the tread of the wheel tire, the outward bend at the ends of clamp 20 enabling the ends to move inward while spreading apart sufficiently to permit the clamp to be positioned and engaged on the tire. The tire chain may be secured to the hooks 21 and 22 of the tire clamp either before or after it is mounted on the tire. As stated above, the link 10, after it has been attached to the tire chain to serve as the end link at one end of the longitudinally extending member 14, is hung over hook 21 on the inside of the tire clamp, and it will be seen that in this position its hook 15 will be projecting forwardly in a direction to meet the link 14a at the opposite end of said chain member 14 as soon as the chain is wrapped around the tire. Similarly the link 18, next to clasp $c$, on said longitudinal member 17, is hooked over the hook 22 on the outside of clamp 20, and in this position clasp $c$ will be in readiness to engage end link 17ª after the chain has been wrapped around the wheel After the tire has been rotated through approximately 360°, as by driving the vehicle forward sufficiently to rotate the wheels through this distance, the free end links 14ª and 17ª of longitudinal members 14 and 17 respectively will be hanging down in close proximity to the hooks 21 and 22 respectively of clamp 20, and it is then an easy matter to reach behind the tire and slip the end link 14ª over the hook 15 of link 10, thus making longitudinal chain member 14 into an endless member lying on the inside face of the tire. Similarly clasp c is secured to link 17ª of member 17, thus making member 17 into an endless member lying on the outside face of the tire. Clamp 20 is disengaged from the tire, and from link 10, and from link 18, if link 18 has not already been detached from hook 22, by simply pulling it off. Hooks 21 and 22, being spaced from clamp 20 at their open ends, are freely disengaged. It then only remains to attach the end link clamp 17ª of longitudinal chain member 17 to the clasp c of member 17, if this has not been done while clamp 20 remained on the tire.

The link 10, with its forwardly projecting hook 15, greatly simplifies the attaching of the respective ends of the member 14 on the inside of the tire. Not only does the provision of link 10 make it easy to engage the opposite end link 14ª, but the manner in which link 10 is supported in fixed position on the inner side of the vehicle wheel makes it a simple matter to attach link 14ª to hook 15 of link 10, using only one hand. The co-action between hook 16 of link 10 and the hook 21 of clamp 20 makes it possible to speedily position link 10 initially, in a position on the tire where it will be easy to attach the opposed link 14ª to it after the free end of the tire chain has been wrapped around the vehicle wheel. Another advantage of the combination of the link and clamp disclosed herein is their readily disengageable character, making it possible for the one putting on the tire chain to simply pull clamp 20 off the wheel after it has served its purpose.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

What I claim is:

1. A link for attachment to one end of a tire chain comprising an elongated body having an aperture adjacent one end to receive a tire chain link, a projection intermediate its ends, and a hook adjacent the other end of said body, the free end of the hook being turned back over the body, substantially in the same plane containing said projection.

2. In combination, a clamp adapted to be mounted over a tire mounted on a vehicle wheel and having a hook-like projection extending outwardly from the clamp and having a portion extending substantially parallel with the clamp but spaced therefrom, and a link for attachment to one end of a tire chain, adapted to be inserted between said tire clamp and the said portion of the said hook-like member, and having intermediate its ends a projection by which said link may be supported on the said portion of said hook-like member, and having an aperture adjacent one end to receive a tire chain link and a hook adjacent its other end contained substantially in the same plane containing said projection.

PEARL C. STARK.

REFERENCES CITED

The following references are of record in the file of this patent:

UNITED STATES PATENTS

| Number | Name | Date |
|---|---|---|
| 280,636 | Lenox | July 3, 1883 |
| 447,618 | Miller | Mar. 3, 1891 |
| 475,589 | Mills | May 24, 1892 |
| 632,704 | Fantroy | Sept. 12, 1899 |
| 709,879 | Deardorff | Sept. 30, 1902 |
| 890,698 | Olson | June 16, 1908 |
| 1,065,758 | Woodwell | June 24, 1913 |
| 1,215,245 | Boyter | Feb. 6, 1917 |
| 1,266,507 | Ludwig | May 14, 1918 |
| 1,340,183 | Parker | May 18, 1920 |
| 1,367,640 | Todd | Feb. 8, 1921 |
| 1,458,069 | London | June 5, 1923 |
| 1,490,806 | Doarman | Apr. 15, 1924 |
| 1,777,773 | Sjodin | Oct. 7, 1930 |
| 1,806,840 | Campbell | May 26, 1941 |
| 2,328,680 | Royer | Sept. 7, 1943 |
| 2,395,013 | Reese | Feb. 19, 1946 |

FOREIGN PATENTS

| Number | Country | Date |
|---|---|---|
| 151,113 | Switzerland | Feb. 1, 1930 |